(12) United States Patent  (10) Patent No.: US 8,336,067 B2
Howarter et al.  (45) Date of Patent: Dec. 18, 2012

(54) SYSTEM AND METHOD FOR BYPASSING AN EMERGENCY ALERT BREAK-IN

(75) Inventors: Jamie Howarter, Overland Park, KS (US); Douglas Ceballos, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 513 days.

(21) Appl. No.: 12/370,912

(22) Filed: Feb. 13, 2009

(65) Prior Publication Data

US 2010/0211970 A1    Aug. 19, 2010

(51) Int. Cl.
H04N 7/10 (2006.01)
H04N 7/025 (2006.01)

(52) U.S. Cl. ............ 725/33; 725/34; 725/35; 725/36

(58) Field of Classification Search .......... 725/32–36
See application file for complete search history.

(56) References Cited

U.S. PATENT DOCUMENTS

| | | | |
|---|---|---|---|
| 5,572,201 A | 11/1996 | Graham et al. | |
| 5,774,172 A | 6/1998 | Kapell et al. | |
| 5,995,553 A | 11/1999 | Crandall et al. | |
| 6,100,916 A | 8/2000 | August et al. | |
| 6,853,355 B1 | 2/2005 | Kang et al. | |
| 7,003,052 B2 | 2/2006 | Koike | |
| 7,444,657 B2* | 10/2008 | Kendall et al. | 725/33 |
| 8,099,750 B2 | 1/2012 | Howarter et al. | |
| 2002/0124252 A1 | 9/2002 | Schaefer et al. | |
| 2003/0069002 A1 | 4/2003 | Hunter et al. | |
| 2003/0216133 A1 | 11/2003 | Poltorak | |
| 2004/0049785 A1 | 3/2004 | Grzeczkowski et al. | |
| 2004/0123316 A1 | 6/2004 | Kendall et al. | |
| 2005/0118984 A1 | 6/2005 | Akiyama et al. | |
| 2006/0015898 A1* | 1/2006 | Kim et al. | 725/33 |
| 2006/0271952 A1* | 11/2006 | Gurley et al. | 725/33 |
| 2007/0037549 A1 | 2/2007 | Poltorak | |
| 2007/0118861 A1* | 5/2007 | Stone | 725/80 |
| 2007/0136743 A1* | 6/2007 | Hasek et al. | 725/33 |
| 2007/0143816 A1* | 6/2007 | Gupta et al. | 725/135 |
| 2007/0186269 A1* | 8/2007 | Malik | 725/135 |
| 2007/0204291 A1 | 8/2007 | Ichihashi | |
| 2008/0059998 A1* | 3/2008 | McClenny et al. | 725/33 |
| 2008/0109839 A1 | 5/2008 | Bruce et al. | |
| 2008/0115171 A1 | 5/2008 | Barsness et al. | |
| 2008/0120639 A1* | 5/2008 | Walter et al. | 725/33 |
| 2008/0120640 A1* | 5/2008 | Yun et al. | 725/33 |
| 2008/0122988 A1 | 5/2008 | Johnston | |
| 2008/0216113 A1* | 9/2008 | Yun et al. | 725/33 |

(Continued)

OTHER PUBLICATIONS

U.S. Appl. No. 12/370,930; Non-Final Rejection dated Mar. 10, 2011; 12 pages.

(Continued)

*Primary Examiner* — Jason Salce

(74) *Attorney, Agent, or Firm* — Swanson & Bratschun, L.L.C.

(57) ABSTRACT

Embodiments of the disclosed invention include a system and a method for bypassing an emergency alert break-in. An emergency alert break-in means any message, alert, and/or newscast that interrupts by preempting and/or modifying displaying of a regularly scheduled program to present information associated with an urgent and/or important event. For example, in one embodiment, a method is disclosed that includes receiving data from a media content provider; identifying from the data an emergency alert break-in; presenting a user interface that includes an option for bypassing the emergency alert break-in; and displaying a regularly scheduled program in response to receiving a request to bypass the emergency alert break-in.

4 Claims, 6 Drawing Sheets

U.S. PATENT DOCUMENTS

| | | | | |
|---|---|---|---|---|
| 2009/0025027 A1* | 1/2009 | Craner | ............................ | 725/32 |
| 2009/0119728 A1* | 5/2009 | Broberg | ......................... | 725/114 |
| 2009/0199232 A1 | 8/2009 | Takeyama et al. | | |
| 2009/0271818 A1* | 10/2009 | Schlack | ........................... | 725/33 |
| 2009/0282434 A1 | 11/2009 | Yasuho et al. | | |
| 2010/0138858 A1* | 6/2010 | Velazquez et al. | .............. | 725/33 |
| 2010/0146541 A1* | 6/2010 | Velazquez | ........................ | 725/33 |
| 2010/0162299 A1 | 6/2010 | Downey | | |
| 2010/0162300 A1* | 6/2010 | Velazquez et al. | .............. | 725/33 |

OTHER PUBLICATIONS

U.S. Appl. No. 12/370,930; Notice of Allowance dated Sep. 1, 2011; 9 pages.

U.S. Appl. No. 12/370,930; Requirement for Restriction/Election dated Dec. 1, 2010; 8 pages.

U.S. Appl. No. 12/370,944; Final Rejection dated Aug. 9, 2011; 10 pages.

U.S. Appl. No. 12/370,944; Non-Final Rejection daed Mar. 4, 2011; 10 pages.

U.S. Appl. No. 12/370,944; Requirement for Restriction/Election dated Dec. 1, 2010; 6 pages.

U.S. Appl. No. 12/370,930; Issue Notification dated Dec. 28, 2011; 1 page.

* cited by examiner

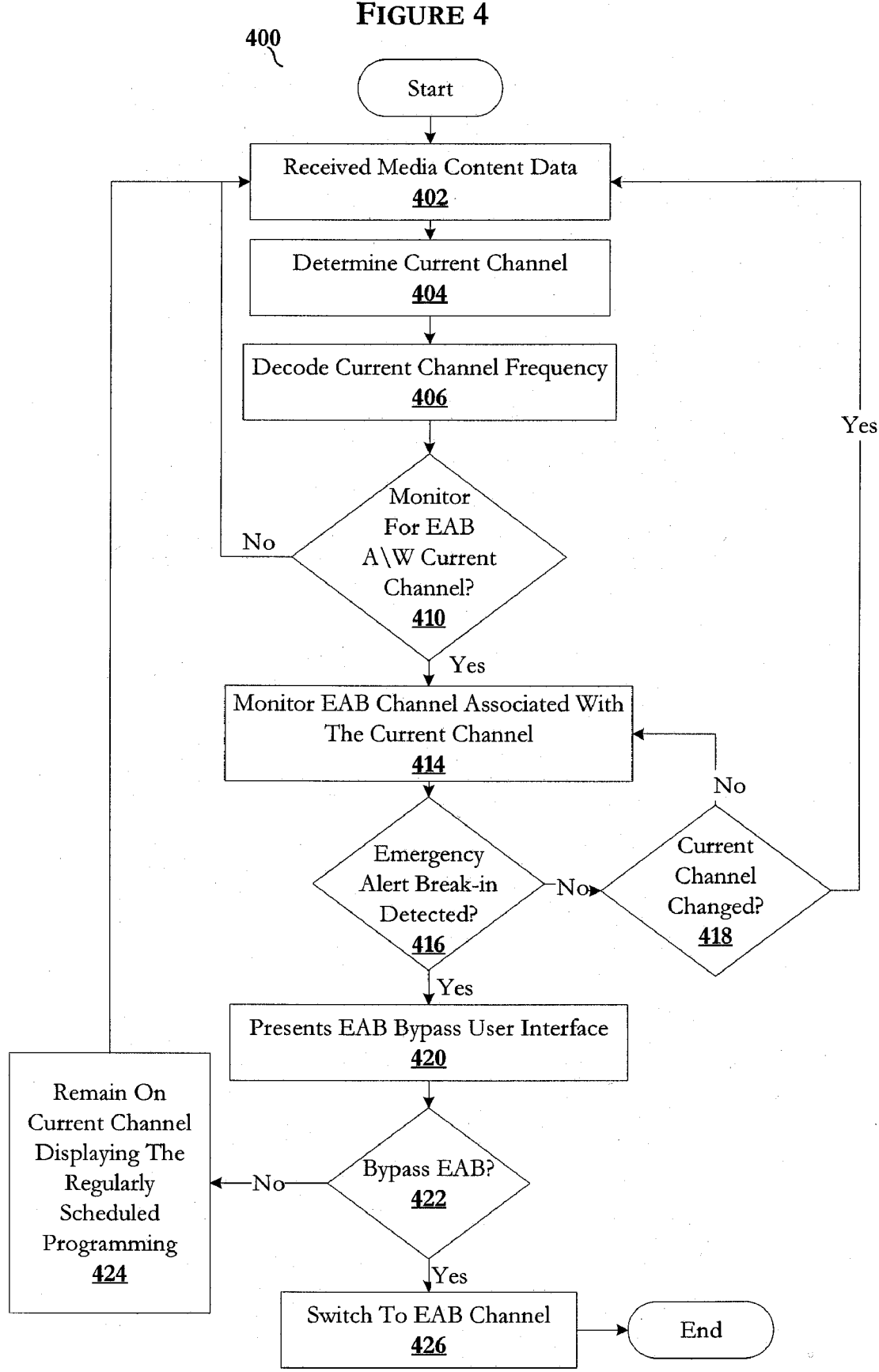

US 8,336,067 B2

SYSTEM AND METHOD FOR BYPASSING AN EMERGENCY ALERT BREAK-IN

CROSS REFERENCE TO RELATED APPLICATION

The present invention is related to the following patent applications: entitled "System And Method For Displaying An Emergency Alert Message", Ser. No. 12/370,944; and "System and Method for Bypassing an Emergency Alert Break-In For a Recorded Event", Ser. No. 12/370,930; filed even date hereof, assigned to the same assignee, and incorporated herein in its entirety by reference.

BACKGROUND OF THE INVENTION

The Emergency Alert System is a national public warning system that stems from the desire of the President of the United States to communicate with the public in times of national emergencies. In the early 1960s, the chief executive began allowing local and state authorities to use the system to transmit localized warnings, such as, but not limited to, child abduction emergencies (AMBER alerts) and weather information. The system has been designed to deliver messages quickly and automatically in the event of an emergency. Among its most conspicuous features to the public may be the automatic interruption of broadcast programming that replaces program audio with an aural alert and superimposes a text crawl with warning information at the bottom of the TV screen. In some situations, a local news broadcasting station may completely preempt a regularly scheduled program.

SUMMARY

Embodiments of the disclosed invention include a system and a method for bypassing an emergency alert break-in. For example, in one embodiment, a method is disclosed that includes receiving data from a media content provider; identifying from the data an emergency alert break-in; presenting a user interface that includes an option for bypassing the emergency alert break-in; and displaying a regularly scheduled program in response to receiving a request to bypass the emergency alert break-in.

In another embodiment, a set top box is disclosed that includes a memory component for storing computer executable instructions; a communication interface for receiving data from a media content provider; a decoder module for decoding the received data; an emergency alert break-in monitoring module for identifying an emergency alert break-in from the received data; an emergency alert break-in user interface bypass module for generating and displaying an emergency alert break-in bypass user interface that enables a viewer to bypass an identified emergency alert break-in; and an emergency alert break-in bypass module for bypassing the identified emergency alert break-in in response to receiving a user request to bypass the identified emergency alert break-in.

BRIEF DESCRIPTION OF THE DRAWINGS

Illustrative embodiments of the present invention are described in detail below with reference to the attached drawing figures, which are incorporated by reference herein and wherein:

FIG. 3 depicts a block diagram illustrating one embodiment for bypassing an emergency alert break-in;

FIG. 4 depicts a flowchart for bypassing an emergency alert break-in in accordance with the disclosed embodiment of FIG. 3;

FIG. 5 depicts a block diagram illustrating another embodiment for bypassing an emergency alert break-in;

FIG. 7 depicts an embodiment of a bypass user interface for bypassing an emergency alert break-in.

DETAILED DESCRIPTION

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

The disclosed embodiments recognize deficiencies associated with the current emergency alert system. For example, the disclosed embodiments recognize that, in some situations, a viewer prefers that a regularly scheduled program not be interrupted by a local news break-in and/or by an emergency alert system message. For instance, in some situations, such as, but not limited to, a weather warning, the affected areas may be miles away from a viewer's location. Accordingly, the disclosed embodiments provide a user option for bypassing an emergency alert system message and/or a local news break-in.

Figure 1:
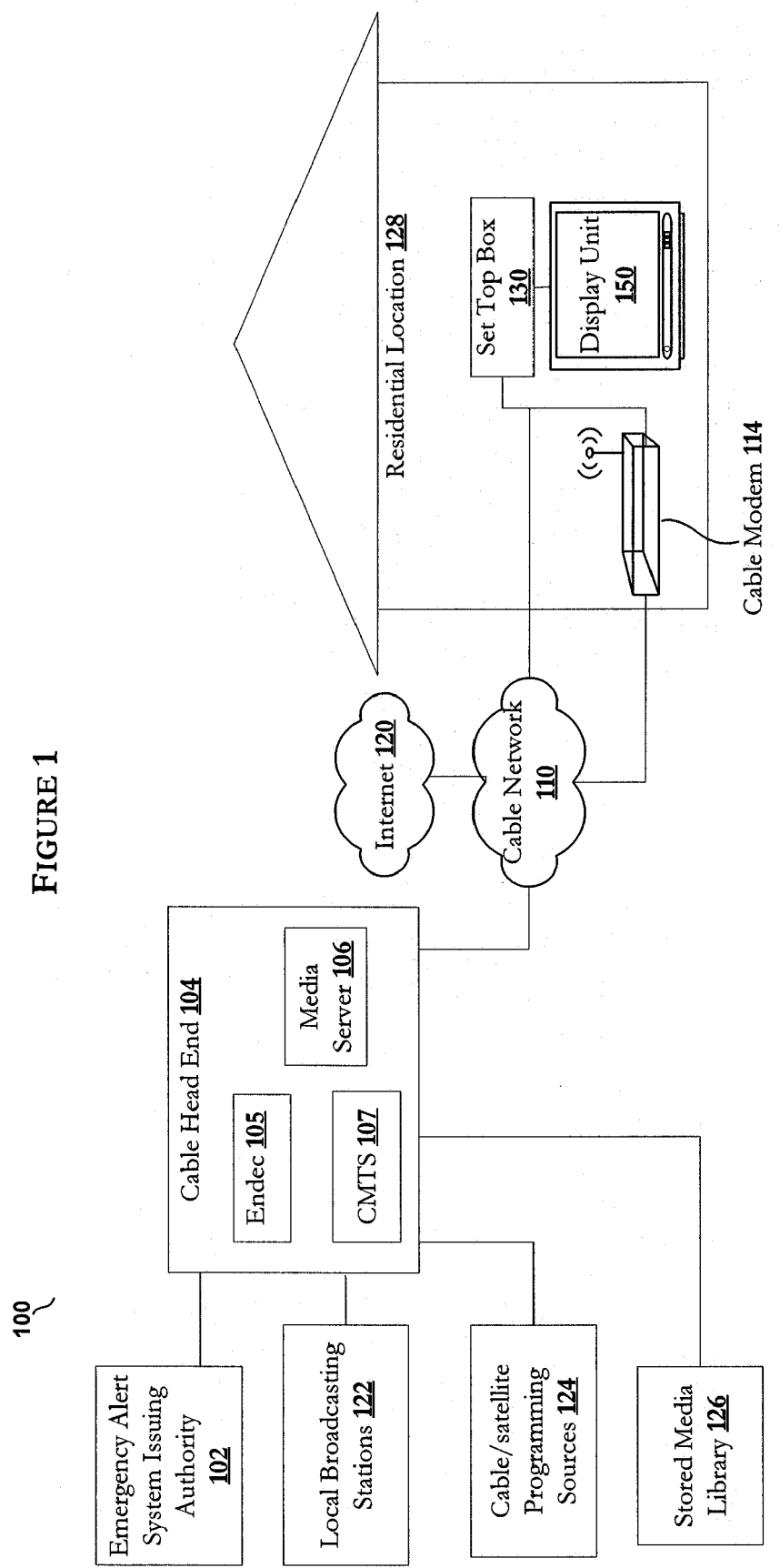
FIG. 1 depicts an embodiment of a network environment in which the illustrative embodiments may be implemented.

FIG. 1 depicts a network environment 100 in which the illustrative embodiments may be implemented for bypassing an emergency alert break-in. The term "bypass" and/or "bypassing," as referenced herein, means either "not displaying" or "discontinue displaying." In addition, as further referenced herein, an emergency alert break-in means any message, alert, and/or newscast that interrupts by preempting (e.g., a local news break-in) and/or modifying displaying of a regularly scheduled program (e.g., adding an emergency alert system message crawling text at the bottom of the screen) to present information associated with an urgent and/or important event.

In the depicted embodiment, an emergency alert system (EAS) issuing authority 102 sends out an emergency alert system signal that includes information associated with an emergency alert system message. Emergency alert system issuing authority 102 includes national, state, and local authorities. For example, at the national level, the President may activate the emergency alert system. Additionally, the National Weather Service (NWS) and the Federal Emergency Management Agency (FEMA) may also transmit messages using the emergency alert system. At the state and local level, the EAS State Emergency Communications Committee (SECC), Local Emergency Communications Committee (LECC), and local broadcasting stations may transmit alert messages, such as, but not limited to, child abduction emergencies (AMBER alerts) and weather alerts/reports, using the emergency alert system.

One or more cable/satellite head ends, such as, but not limited to, cable head end 104, receives the emergency alert system signal from emergency alert system issuing authority 102 and/or from a neighboring broadcasting station relaying the emergency alert system message. Cable head end 104 is a facility that originates and communicates cable/satellite TV services to a plurality of subscribers, such as, but not limited to, residential location 128 via cable network 110. In some embodiments, cable network 110 may include, but is not limited to, one or more coaxial cable networks, fiber-optic networks, and/or satellite networks. Additionally, in some embodiments, cable network 110 may also include twisted pair networks for providing IPTV cable television-type services.

In one embodiment, cable head end 104 includes an emergency alert system encoder/decoder (endec) 105 for receiving and decoding an emergency alert system signal. In one embodiment, emergency alert system encoder/decoder 105 decodes an emergency alert system signal to determine the emergency type and affected areas associated with the emergency alert system signal. For example, an emergency alert system signal contains codes that identify the key elements of an emergency alert system message, such as, but not limited to, the message originator, the event, the location of the event, and the valid time period of the message.

In some embodiments, emergency alert system encoder/decoder 105 passes the decoded emergency alert system message to a media server 106. In one embodiment, media server 106 includes computer executable instructions and/or electronic components that automatically recognize incoming EAS information and generates the appropriate emergency text crawl and/or other appropriate display information associated with the emergency alert system message for overlaying the emergency alert system message over a television program.

In one embodiment, cable head end 104 utilizing media server 106 and/or other appropriate device encodes a plurality of television programming signals from a variety of input sources, such as, but not limited to, one or more local broadcasting stations 122, cable/satellite programming sources 124, and stored media library 126. In some embodiments, cable head end 104 receives signals broadcasted from local broadcasting stations 122 over the air using cell transmission towers. In addition, in one embodiment, cable head end 104 may encode one or more television signals, such as, but not limited to, signals received from local broadcasting stations 122, with an emergency alert system message in response to receiving an emergency alert system message originating from emergency alert system issuing authority 102.

In some embodiments, cable head end 104 may include a cable modem termination system (CMTS), such as, CMTS 107, for providing high-speed Internet access via a cable modem to subscribers. In one embodiment, CMTS 107 sends and receives digital cable modem signals on cable network 110, such as, but not limited to, receiving signals sent upstream from a subscriber's cable modem, such as, cable modem 114. In some embodiments, CMTS 107 converts the signals into IP packets and routs the signals to an Internet Service Provider for connection to Internet 120. Internet 120 is a massive network of networks that connects millions of computers/electronic devices together globally, forming a network in which any computer/electronic device can communicate with any other computer/electronic device as long as they are both connected to the Internet 120. In addition, in some embodiments, CMTS 107 may also send signals downstream to cable modem 114. In one embodiment, cable modem 114 may be hardwired to set top box 130 for communicating data between set top box 130 and cable modem 114. In some embodiments, cable modem 114 may include a wireless transceiver for communicating data wirelessly to one or more electronic device, such as, but not limited to, set top box 130.

In accordance with one embodiment, a cable/satellite programming provider may provide, as a premium service, or as a free service to their subscribers the ability to bypass an emergency alert break-in over a regularly scheduled program. For instance, with the advent of digital television (DTV), i.e., the sending and receiving of moving images and sound by discrete digital signals, cable head end 104 may transmit thousands of digital channels in the same space/bandwidth as would have been utilized by a couple hundred analog channels. In accordance with one embodiment, cable head end 104 may encode a set of regularly scheduled programs over a pre-specified number of channels and encode an emergency alert break-in signal(s) on a different set of channel frequencies. As will be further described, in one embodiment, a set top box, such as, but not limited to, set-top box 130, monitors the different set of channel frequencies for detecting an emergency alert break-in signal. In one embodiment, in response to detecting an emergency alert break-in signal, set-top box 130 notifies a viewer via display unit 150 and provides the viewer an option to bypass the emergency alert break-in. If the viewer chooses not to bypass the emergency alert break-in, set top box 130 switches to the appropriate channel frequency for displaying the emergency alert system message and/or the local news break-in.

In accordance with another embodiment, cable head end 104 may encode an emergency alert break-in signal and transmit the encoded emergency alert break-in signal over the same channel frequency as a regularly scheduled program. In these embodiments, in response to receiving a user request to bypass the emergency alert break-in, set-top box 130 may, in one embodiment, using cable modem 114, send an upstream request for the regularly scheduled program via Internet 120 to cable modem termination system 107. In one embodiment, cable head end 140 may stream/transmit the requested the regularly scheduled program to set top box 130 via Internet 120. In response to receiving a streaming program, set-top box 130 decodes and displays the streaming program. Thus, the user is able to bypass viewing of a local news break-in and/or an emergency alert system message and continue to view a regularly scheduled program.

Figure 2:
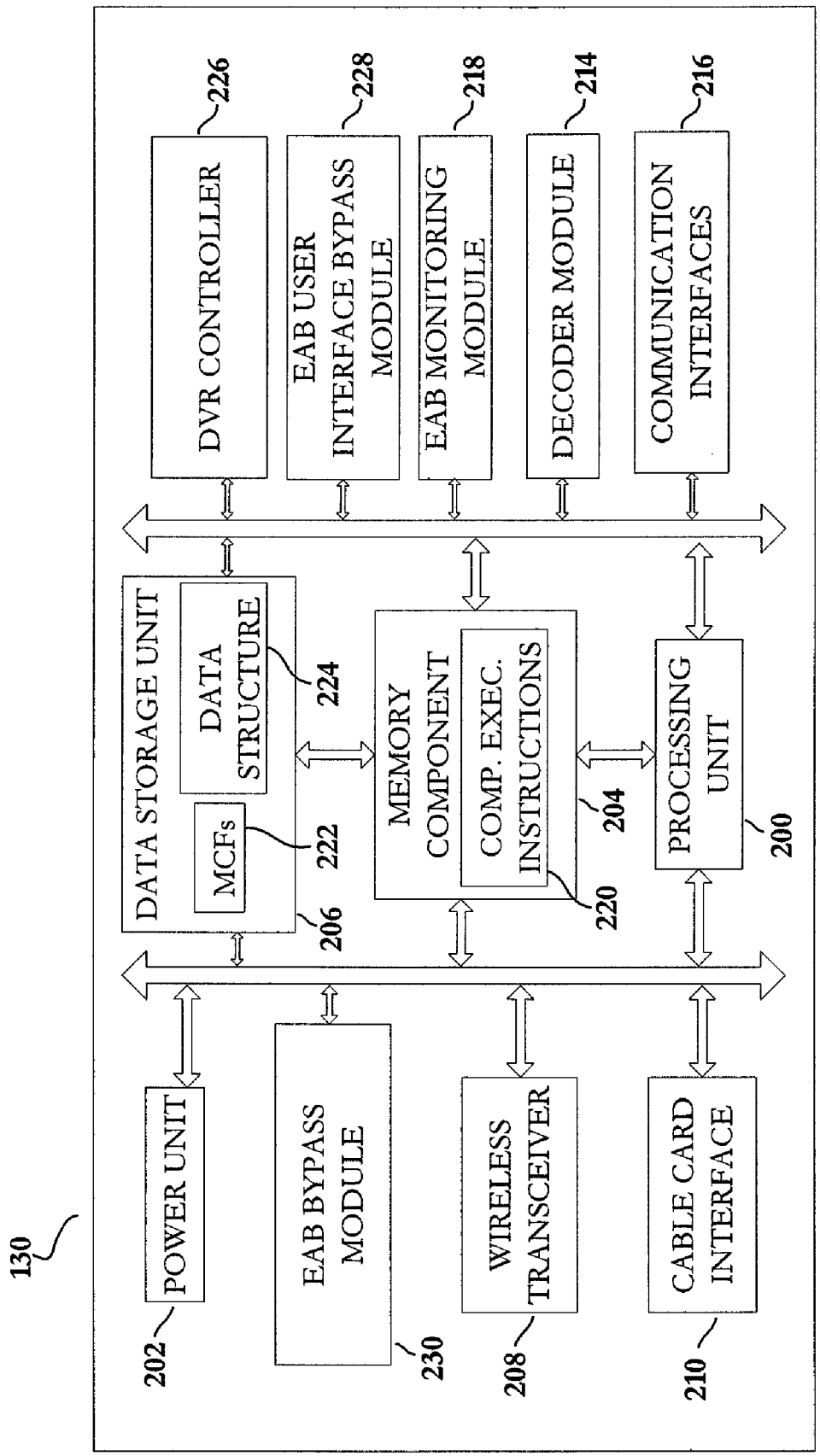
FIG. 2 depicts an embodiment of a set top box in accordance with the illustrative embodiments.

FIG. 2 depicts an embodiment of set top box 130 for bypassing an emergency alert break-in. In the depicted embodiment, set top box 130 comprises, among other components, a processing unit 200, a power unit 202, a memory component 204, a data storage unit 206, a wireless transceiver 208, a cable card interface 210, a decoder module 214, and a set of communication interfaces 216.

Processing unit 200 may comprise of one or more microprocessors for executing computer usable program code/instructions for providing television programming and for bypassing an emergency alert break-in. For example, in one embodiment, processing unit 200 executes computer executable instructions 220 stored in memory component 204 for identifying an emergency alert break-in signal and presenting a user interface for enabling a user to bypass the emergency alert break-in.

In some embodiments, memory component 204 is a volatile memory component of set top box 130. Volatile memory is memory that loses its contents when set top box 130 loses power. For example, in some embodiments, memory component 204 may be random access memory (RAM). Random access memory stores currently executing instructions and/or data utilized by an operating system, software program, hardware device, and/or a user.

Data storage unit 206 is a non-volatile memory component of set top box 130, such as, but not limited to, a hard disk drive. Non-volatile memory retains stored data when power is loss. In some embodiments, data storage unit 206 may be an external hard drive and/or a network data storage unit. In some embodiments, data storage unit 206 may store media content files 222, such as, but not limited to, television content received from cable head end 104. In addition, in accordance with one embodiment, data storage unit 206 may store a data structure 224, such as, but not limited to, a data table that includes a list of emergency alert break-in monitoring channels corresponding to a plurality of regularly scheduled program broadcasting channels.

In addition, in some embodiments, set top box 130 may include a digital video recorder (DVR) controller 226 for recording and playback of media content files 222. In some embodiments, DVR controller 226 may be utilized for interrupting the playback of media content files 222 for displaying a received emergency alert break-in signal.

In accordance with the disclosed embodiments, set top box 130 includes communication interfaces 216 for receiving media content signals/data from, but not limited to, cable head end 104. In addition, in some embodiments, communication interfaces 216 may provide connection ports for coupling set top box 130 to one or more electronic devices. For example, in one embodiment, communication interfaces 216 includes a video output interface, such as, but not limited to, a coaxial cable connection for coupling set top box 130 to display unit 150 (as depicted in FIG. 1). In some embodiments, communication interfaces 216 may include an Ethernet port and/or a telephone line port for connecting set top box 130 to a network device over the telephone network and/or the Internet. Additionally, in some embodiments, set top box 130 may include other connector ports, such as, but not limited to, a 1394 port, a universal serial bus (USB) port, and/or a high-definition multimedia interface (HDMI).

Set top box 130 may also include one or more decoder module 214 for decoding received media content signals, such as, but not limited to, cable television signals received from cable head end 104. For example, in some embodiments, decoder module 214 may be a quadrature amplitude modulation (QAM) tuner. Quadrature amplitude modulation is one format by which digital media content channels are encoded and transmitted by a cable company, such as, cable head end 104. A QAM tuner is an electronic tuning device used in digital television sets, set top boxes, DVRs, and other electronic equipment to tune/decode the received media content channels. In some embodiments, decoder module 214 may also be an Advanced Television Systems Committee (ATSC) tuner/receiver for receiving and decoding over the air digital channels.

In accordance with one embodiment, set top box 130 may include an emergency alert break-in (EAB) monitoring module 218 for identifying/detecting an emergency alert break-in signal. For example, all emergency alert system messages are required to be digitally encoded with a header, an attention signal, an audio announcement, and a digitally encoded end-of-message marker. The header includes information about who originated the alert (the President, state or local authorities, the National Weather Service, or the broadcaster), a short, general description of the event (tornado, flood, severe thunderstorm), the counties or states affected, the expected duration of the event (in minutes), the date and time it was issued, and an identification of the originating station. The attention signal follows the header and may last between 8 to 25 seconds, depending on the originating station. For example, in some embodiments, commercial broadcasting stations, such as local broadcasting stations 122, may broadcast an attention signal consisting of a "two tone" combination of 853 Hz and 960 Hz sine waves. The emergency alert system message ends with three bursts of an end of message indicator, which is the text NNNN, preceded each time by the binary 10101011.

In one embodiment, emergency alert break-in monitoring module 218 may identify an emergency alert break-in signal transmitted from cable head end 104 by recognizing the header information and/or the attention signal associated with an emergency alert system message encoded in one or more broadcast channels. In some embodiments, emergency alert system monitoring module 218 may be a dedicated tuner for monitoring a pre-specified channel and/or set of channels for identifying an emergency alert break-in. For example, in one embodiment, if cable head end 104 transmits only emergency alert break-in signals on a particular set of channel frequencies, emergency alert break-in monitoring module 218 may monitor the particular set of channel frequencies for any incoming signals associated with the particular set of channel frequencies. In one embodiment, if any encoded incoming signals are detected on the pre-specified set of channel frequencies designated for emergency alert break-ins, emergency alert break-in monitoring module 218 presents a user option for either displaying or bypassing the detected emergency alert break-in. In another embodiment, emergency alert break-in monitoring module 218 may monitor one or more channels for a two-tone signal consisting of the combination of 853 Hz and 960 Hz sine waves to recognize the attention signal associated with emergency alert system message. In some embodiments, emergency alert break-in monitoring module 218 may be a component of decoder module 214 for identifying an emergency alert break-in.

In some embodiments, set top box 130 may include an emergency alert break-in user interface bypass module 228 and for generating and displaying an emergency alert break-in bypass user interface for enabling a viewer to a bypass an identified emergency alert break-in. As will be further described in FIG. 7, in some embodiments, an emergency alert break-in bypass user interface may include a brief description related to the emergency alert break-in, such as, but not limited to, the emergency type and the affected area(s).

In addition, in some embodiments, set top box 130 may include an emergency alert break-in bypass module 230 for bypassing an emergency alert break-in in response to receiving a user request to bypass a detected/identified emergency alert break-in signal. As will be further described, in some embodiments, if a viewer selects to view an emergency alert break-in, emergency alert break-in bypass module 230 may switch over, i.e., change channels, to an emergency alert break-in associated with a regularly scheduled program of the current viewing channel. In addition, in another embodiment, emergency alert break-in bypass module 230 may request the regularly scheduled program from cable head end 104 and/or from other media sources in response to receiving a request to bypass an emergency alert break-in.

In one embodiment, set top box 130 may include wireless transceiver 208 for providing short-range exchange of data using, but not limited to, infrared light. For example, wireless transceiver 208 enables a viewer using a remote control device to switch over to an emergency alert break-in channel or continue to view the regularly schedule program. Additionally, in some embodiments, wireless transceiver 208 may utilize a wireless Internet protocol for communicating data wirelessly to cable modem 114.

In some embodiments, set top box 130 may include a cable card interface 210 for interfacing with a plug-in cable/smart card that enables viewing and/or recording of cable television programming. For example, in some embodiments, cable card 210 comprises instructions and/or a decryption key for decoding encrypted cable television signals transmitted by cable head end 104.

Additionally, set top box 130 may include a power source, such as, power unit 202. In one embodiment, power unit 202 converts the input power from an AC adaptor to run various components of set top box 130. In addition, in some embodiments, power unit 202 may include an internal power source, such as, but not limited to, a battery component.

Figure 3:
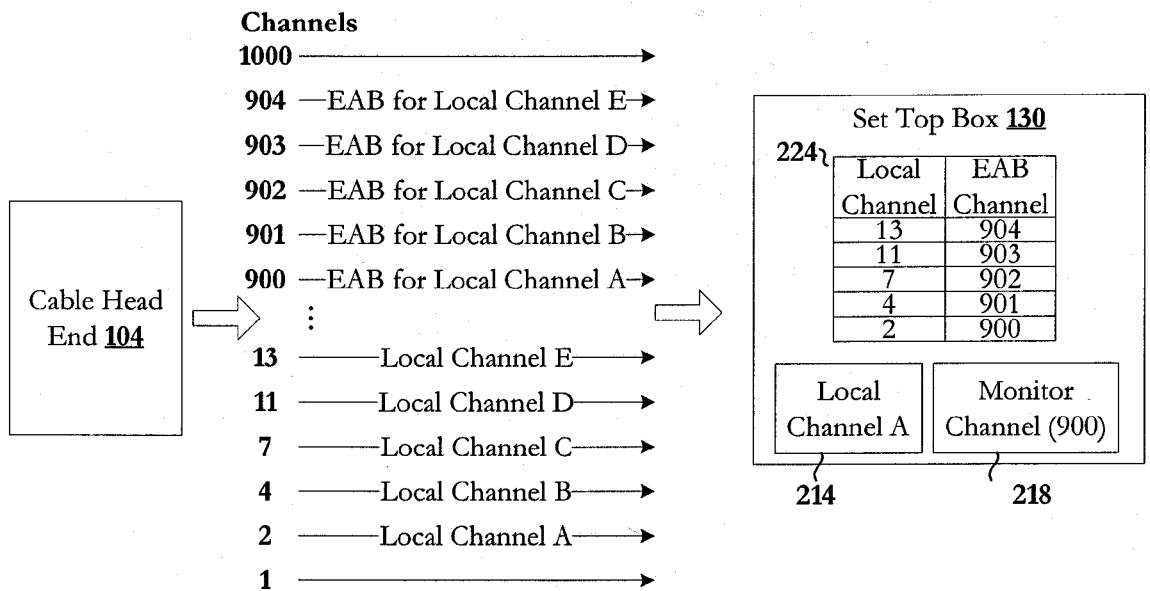

With reference now to FIG. 3, a diagram illustrating one embodiment for bypassing an emergency alert break-in is presented. In the depicted embodiment, cable head end 104 transmits a plurality of channels, such as, but not limited to, channels 1-1000 to a plurality of subscribers. For example, in one embodiment, channels 1-1000 includes five local channels associated with the location of set top box 130. For instance, in the depicted embodiment, local channels A-E are respectively encoded on channel frequencies 2, 4, 7, 11, and 13. In accordance with one embodiment, cable head end 104 may transmit emergency alert break-in signals associated with local channels A-E on a different set of channel frequencies, such as, but not limited to, channels 900-904.

For example, in the depicted embodiment, set top box 130 utilizing decoder module 214 is currently viewing the regularly scheduled program of local channel A. Thus, in one embodiment, emergency alert system monitoring module 218 utilizing data structure 224 monitors channel frequency 900 for identifying an emergency alert break-in signal associated with local channel A.

As an example, FIG. 4 depicts a flowchart in which set top box 130 performs a process 400 for providing a user option for bypassing an emergency alert break-in in accordance with the disclosed embodiment of FIG. 3. Process 400 begins by continuously receiving media content data from, but not limited to, cable head end 140 at step 402. At step 404, the process determines the current channel setting associated with set top box 130. The process, at step 406, decodes the currently set channel frequency and outputs the video/audio signal to the coupled display unit. At step 410, the process determines whether the currently set channel is associated with an emergency alert break-in monitoring channel. For example, as depicted in FIG. 3, in one embodiment, process 400 may perform a lookup using data structure 224 to determine whether the currently set channel is associated with an emergency alert break-in monitoring channel. If the process determines that the currently set channel is not associated with an emergency alert break-in monitoring channel, the process returns to step 402.

However, if the process determines that the currently set channel is associated with an emergency alert break-in monitoring channel, the process monitors the identified emergency alert break-in monitoring channel associated with the currently set channel at step 414. The process determines, at step 416, whether an emergency alert break-in signal is detected on the identified emergency alert break-in monitoring channel. If the process does not detect an emergency alert break-in signal, the process continues to monitor the identified emergency alert break-in monitoring channel at step 414, unless a determination is made at step 418, that the current channel setting has changed.

If the process detects an emergency alert break-in signal on the identified emergency alert break-in monitoring channel, the process, at step 420, presents an emergency alert break-in bypass user interface to a user viewing the coupled display unit. At step 422, the process determines whether an emergency alert break-in bypass request is received. If the process receives a user request to bypass the emergency alert break-in, the process, at step 424, remains on the currently set channel displaying the regularly scheduled programming. However, if the process receives a request to interrupt the regularly scheduled programming with the emergency alert break-in, the process switches over to the identified emergency alert break-in monitoring channel at step 426, with process 400 terminating thereafter. In some embodiments, if a user response is not received within a specified period, the process automatically switches over to the identified emergency alert break-in monitoring channel. Additionally, in some embodiments, after switching over to the identified emergency alert break-in monitoring channel, a user may switch to any desired channel at any time including, but not limited to, the regularly scheduled program. Further, in some embodiments, the process may present a user interface that enables a user to elect to record a bypassed emergency alert break-in for later viewing.

Figure 5:
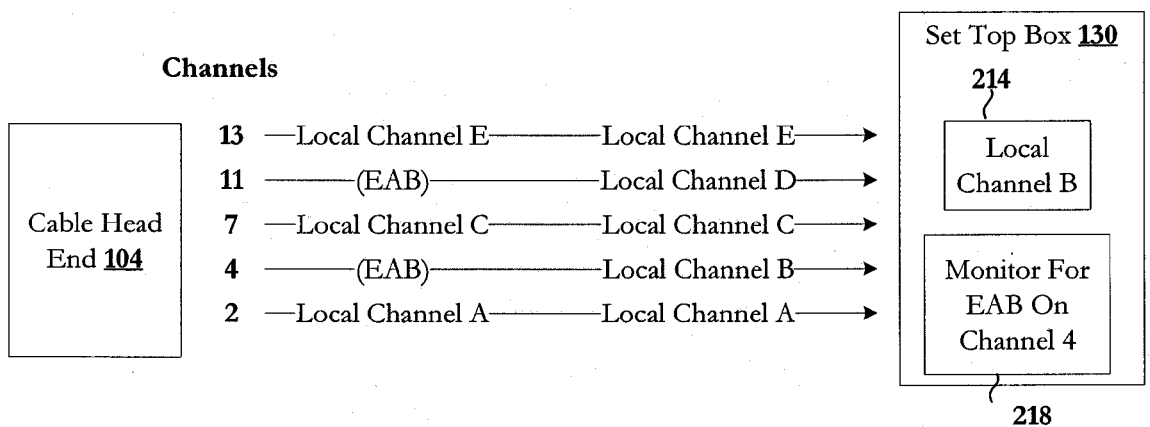

FIG. 5 depicts another embodiment for bypassing an emergency alert break-in. In the depicted embodiment, cable head end 104, similar to FIG. 3, transmits local channels A-E respectively encoded on channel frequencies 2, 4, 7, 11, and 13 to set top box 130. However, in this embodiment, cable head end 104 may respectively transmit emergency alert break-in signals (EAB) associated with local channels A-E on the same frequency channels. In accordance with one embodiment, set top box 130 may utilize emergency alert system monitoring module 218 for detecting an emergency alert break-in associated with local channels A-E. For example, in one embodiment, emergency alert system monitoring module 218 may monitor a currently set channel, such as, but not limited to, local channel B for the two-tone attention signal consisting of 853 Hz and 960 Hz sine waves for identifying an emergency alert break-in.

Figure 6:
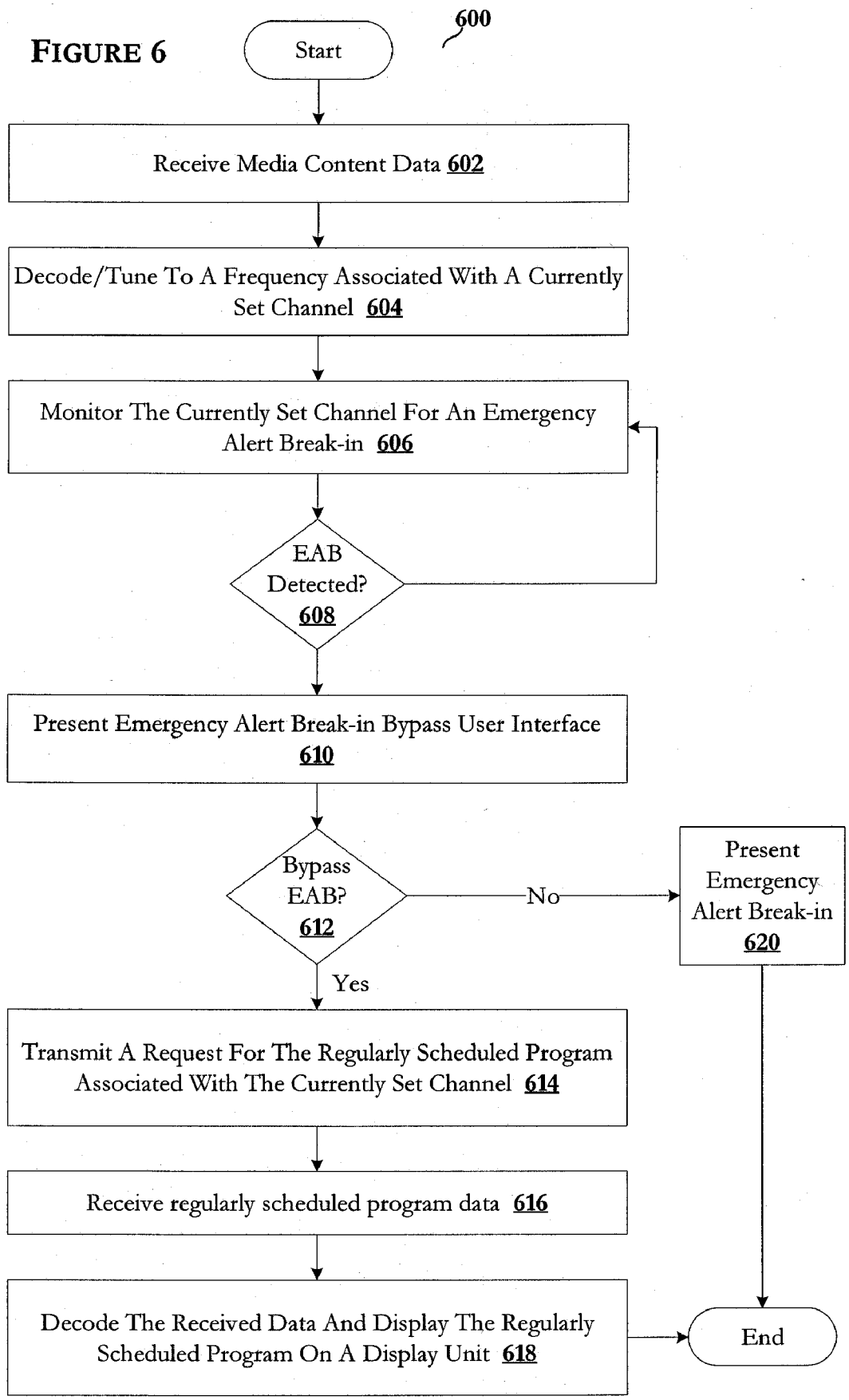
FIG. 6 depicts a flowchart for bypassing an emergency alert break-in in accordance with the disclosed embodiment of FIG. 5.

FIG. 6 depicts a flowchart of a process 600 for providing a user option for bypassing an emergency alert break-in in accordance with the disclosed embodiment of FIG. 5. FIG. 6 begins by receiving, at step 602, media content data from, but not limited to, cable head end 104. At step 604, the process decodes/tunes to a frequency associated with a currently set channel on set top box 130 and outputs the video/audio signal to a coupled display unit. At step 606, the process monitors the currently set channel for an emergency alert break-in. If the process identifies an emergency alert break-in at step 608, the process presents an emergency alert break-in bypass user interface to a user viewing the coupled display unit at step 610. At step 612, the process determines whether an emergency alert break-in bypass request is received. If the process does not receive a user request to bypass the emergency alert break-in, the process displays the emergency alert break-in on a coupled display unit at step 620, with process 600 terminating thereafter.

However, if the process receives a user request to bypass the emergency alert break-in, the process, at step 614, may transmit a request to cable head end 104 for the regularly scheduled program associated with the currently set channel. In one embodiment, cable head end 104 transmits/streams the regularly scheduled program to set top box 130 via cable modem 114. At step 616, the process receives the streamed regularly scheduled program data. The process decodes the received data and displays the regularly scheduled program on the display unit at step 618, with process 600 terminating thereafter.

Alternatively, or in addition to, in some embodiments, set top box 130 may transmit a request to an Internet source, such as, but not limited to, an Internet TV provider source and/or a website of the network associated with the currently set channel (e.g., ABC.com™) to stream the regularly scheduled program. In addition, in some embodiments, the process may periodically present the user bypass user interface in the event a viewer has chosen to view the emergency alert break-in. In another embodiment, the user may initiate the user bypass user interface at any time during the viewing emergency alert break-in.

Figure 7:
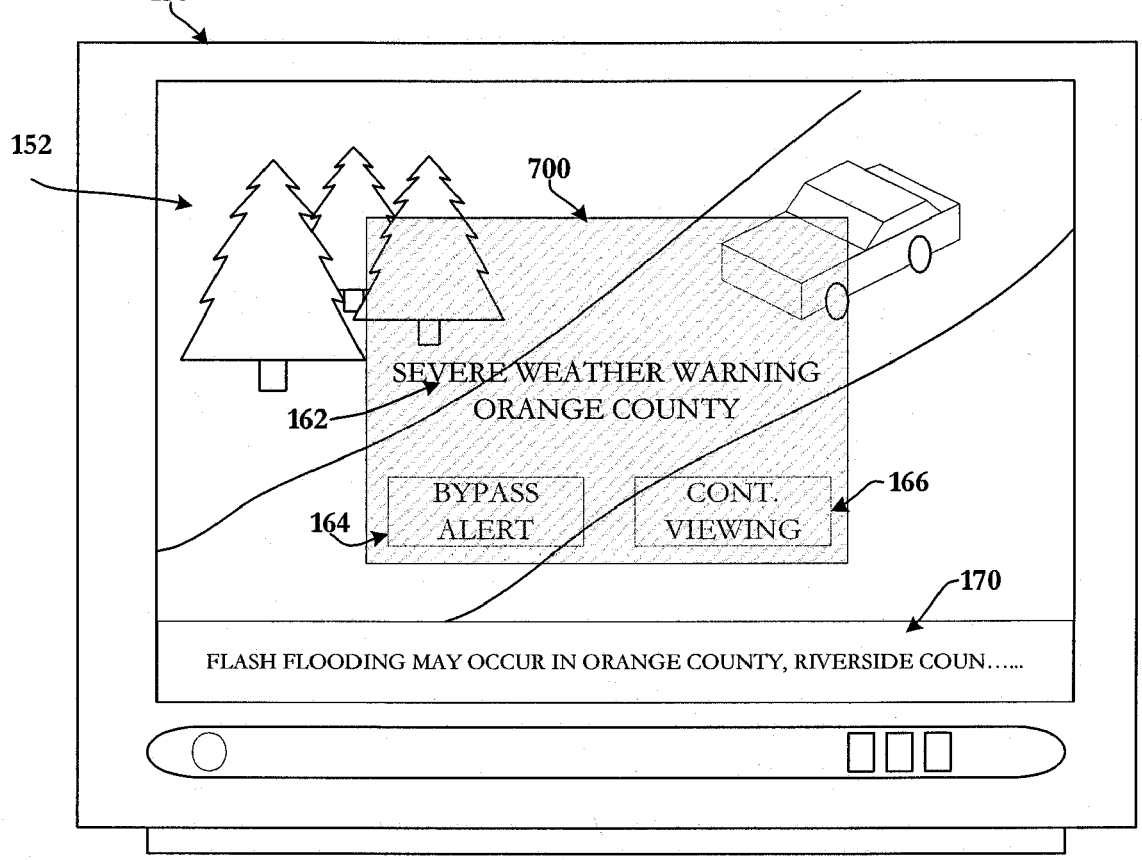

FIG. 7 depicts an embodiment of a bypass user interface 700 for bypassing an emergency alert break-in. In the depicted embodiment, bypass user interface 700 is presented as an overlay window on display unit 150. Display unit 150 displays television program 152. Additionally, in some embodiments, display unit 150 displays an emergency alert system message 170 associated with an emergency alert break-in. In another embodiment, emergency alert break-in may break-in/preempt television program 152, e.g., a local news report.

In one embodiment, bypass user interface 700 includes a bypass alert option 164 and a continue viewing emergency alert option 166. In some embodiments, bypass user interface 700 may indicate a particular set of remote buttons, such as, but not limited to, volume up/down, for selecting bypass alert option 164 or continue viewing emergency alert option 166. In accordance with one embodiment, in response to receiving a bypass alert option 164 command, set top box 130 maintains viewing of the regularly scheduled program, i.e., television program 152, and bypasses viewing of emergency alert system message 170.

Accordingly, embodiments of the disclosed invention include a system and a method for bypassing an emergency alert break-in. For example, in one embodiment, a method is disclosed that includes receiving data from a media content provider; identifying from the data an emergency alert break-in; presenting a user interface that includes an option for bypassing the emergency alert break-in; and displaying a regularly scheduled program in response to receiving a request to bypass the emergency alert break-in.

As will be appreciated by one skilled in the art, the disclosed embodiments may be embodied as a system, method, or computer program product. In addition, the disclosed embodiments including, but not limited to, the disclosed modules may be implemented entirely with hardware or as a software embodiment (including firmware, resident software, micro-code, etc.) or an embodiment combining software and hardware aspects. Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A set-top box for bypassing an emergency alert break-in, the set top box comprising:
  a memory component for storing computer executable instructions;
    a communication interface for receiving data from a media content provider, wherein the received data includes the emergency alert break-in and a regularly scheduled program;
    an emergency alert break-in monitoring module for identifying the emergency alert break-in from the received data;
    an emergency alert break-in bypass user interface module for generating and displaying an emergency alert break-in bypass user interface for enabling a viewer to bypass an identified emergency alert break-in,
    wherein in response to receiving a user request to bypass the identified emergency alert break-in, the set-top box transmits a request to a third party content provider to stream the regularly scheduled program to the set-top box; and
    displaying the regularly scheduled program.

2. The set top box of claim 1, wherein the third party content provider is a television network that provides the regularly scheduled program.

3. A method executed by a set-top box for bypassing an emergency alert break-in, the method comprising:
  receiving data from a media content provider, wherein the data includes the emergency alert break-in and a regularly scheduled program;
  identifying from the data an emergency alert break-in;
    presenting a user interface that includes an option for bypassing the emergency alert break-in;
    responsive to receiving a request to bypass the emergency alert break-in, transmitting a request to a third party content provider to stream the regularly scheduled program to the set-top box; and
    displaying the regularly scheduled program.

4. The method of claim 3, further comprising displaying the emergency alert break-in in response to not receiving a user response to the presented user interface within a specified period.

* * * * *